April 4, 1933. F. E. SYMONS ET AL 1,903,368
FILTER PRESS
Filed March 17, 1932 2 Sheets-Sheet 1
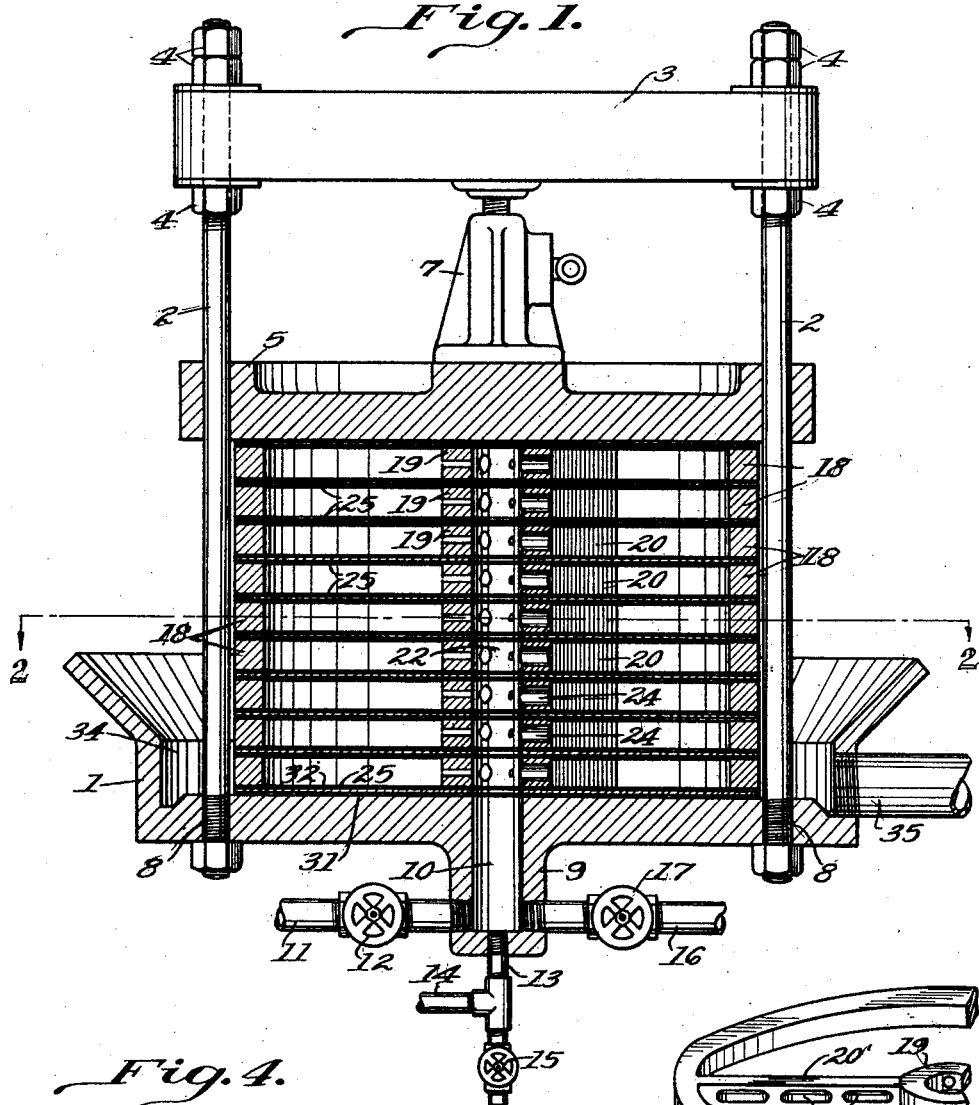
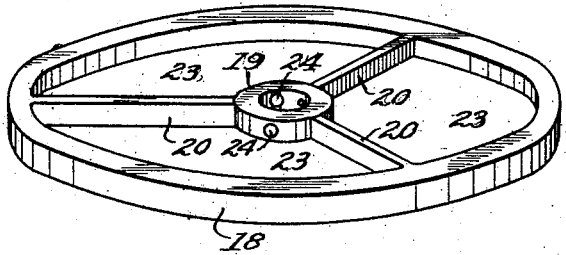
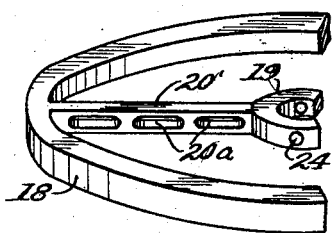
Inventors
F. E. Symons
F. M. Cowgill
By
W. S. McDowell
Attorney April 4, 1933. F. E. SYMONS ET AL 1,903,368
FILTER PRESS
Filed March 17, 1932  2 Sheets-Sheet 2
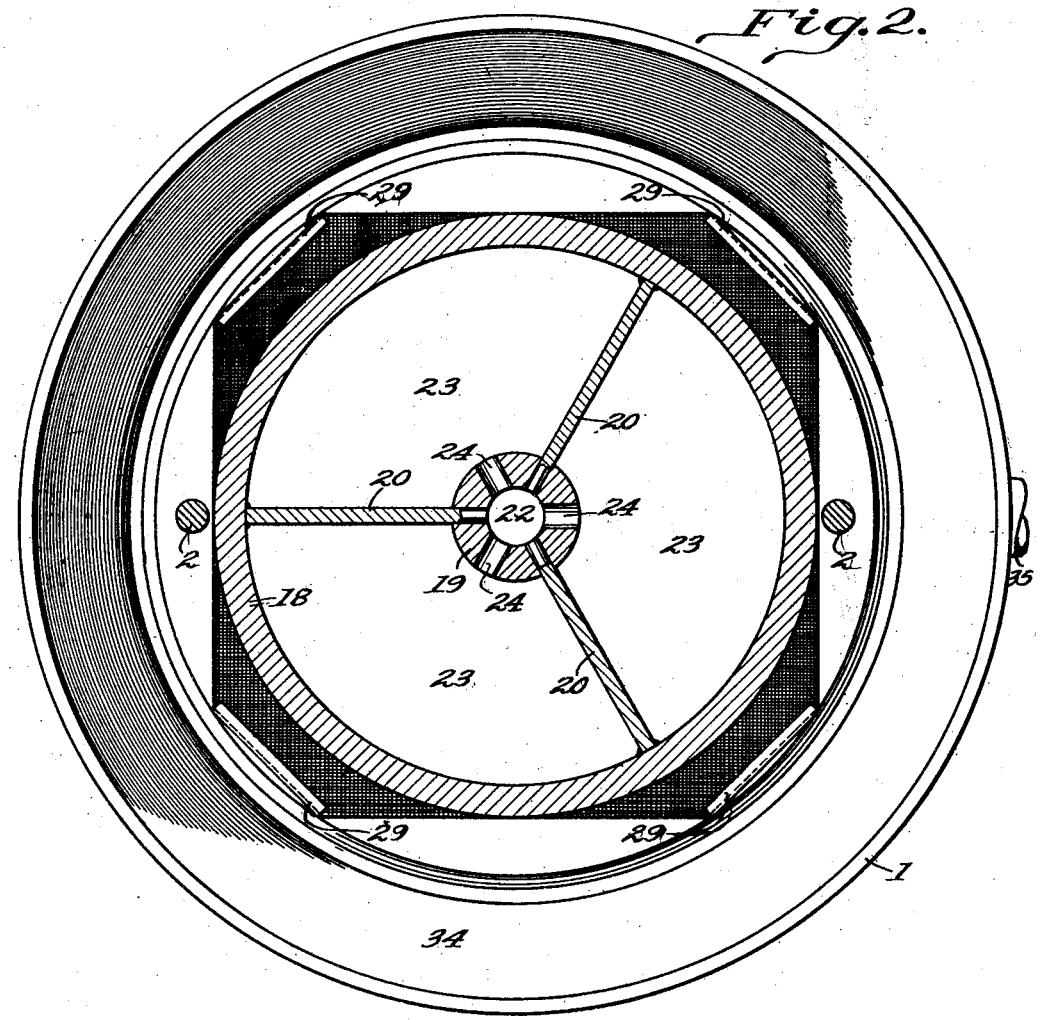
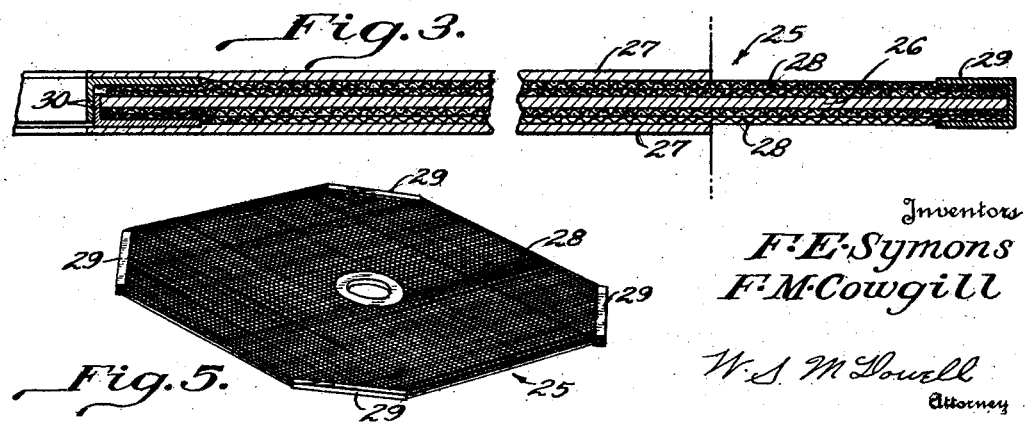
Inventors
F. E. Symons
F. M. Cowgill
W. S. McDowell
Attorney Patented Apr. 4, 1933

1,903,368

UNITED STATES PATENT OFFICE

FRANCIS E. SYMONS AND FRANK M. COWGILL, OF COLUMBUS, OHIO, ASSIGNORS TO RALSTON STEEL CAR COMPANY, OF COLUMBUS, OHIO, A CORPORATION OF OHIO

FILTER PRESS

Application filed March 17, 1932. Serial No. 599,470.

This invention relates to improvements in filter presses, and has particular reference to filter presses of the type employed in the purifying and refining of hydrocarbon oils.

It is an object of the present invention to provide an improved filter press through which a hydrocarbon oil, admixed with a purifying agent is advanced under pressure, the press being provided with an improved screen and filtering members for the purpose of effecting the complete removal of the purifying agent from the oil, the said agent being retained within the press while the agent-freed oil is expressed to a suitable point of discharge and collection.

It is another object of the invention to provide a press of the character specified consisting of a number of compartments having oil screening and filtering outlets and wherein the construction of the press is such that in the event the solid purifying agent clogs or arrests the desired flow of the oil through said compartments, the sustained operation of the press may be maintained by localizing the clogging condition and preventing it from interfering with the general capacity of the press in purifying liquids.

With these and other objects in view, which will appear as the description proceeds, the invention consists in the novel features of construction, combination of elements and arrangements of parts hereinafter fully described and pointed out in the appended claims.

In the accompanying drawings:

Fig. 1 is a vertical sectional view taken through a filter press constructed in accordance with the present invention;

Fig. 2 is a horizontal sectional view taken through the press on the plane indicated by the line 2—2 of Fig. 1;

Fig. 3 is a detail vertical sectional view on an enlarged scale taken through one of the filtering pads;

Fig. 4 is a perspective view of one of the spacing frames;

Fig. 5 is a detail perspective view of one of the filtering pads;

Fig. 6 is a detail perspective view showing a slightly modified form of spacing frame.

Referring more particularly to the drawings, our improved filter press comprises a base section 1, preferably in the form of a metallic casting and which is adapted to be supported in any suitable manner. Carried by the base section 1 are upright guide rods 2 which have their upper ends connected with a transversely extending cross beam 3, the upper ends of the rods 2 extending through openings provided in the beam 3 and nuts 4 are carried by the upper ends of said rods to securely unite the latter in connection with the cross beam. Slidably carried by the rods 2 is a platen or top casting 5, and arranged between the platen 5 and the cross beam 3 is a screw-type jack 7. By the rotation of the operating shaft of said jack, the latter may be expanded or contracted, with respect to its effective length. The lower ends of the rods 2 have threaded connection as at 8 with the base casting 1.

Axially, the base casting is provided with an integral depending hub like extension 9 formed with an internal passage 10. A fluid inlet pipe line 11 communicates with the bottom of the passage 10 and a mixture of the liquid to be filtered and a purifying agent such as fuller's earth is forced, usually under pump pressure through the line 11 and into the passage 10. The pipe line is provided with a control valve as indicated at 12. The bottom of the passage 10 communicates with an air and drain connection 13, an air outlet 14 being united with this connection as well as a drain valve 15. In registration with the inlet pipe 11, we provide a by-pass line 16, which is valved as at 17 and which may be adjusted to govern the travel of liquid mixture through the filter press, as to quantity and pressure.

Our invention particularly resides in the provision of an improved filtering means located between the base section 1 and the platen 5. This filtering means comprises a plurality of spacing frames which, in the present instance, are of circular form and are placed one on the other in vertical superposed relationship. Each of the frames comprises an annular rim 18, a central hub 19 and a plurality of radially disposed dividing bars 20. Each frame is provided with an axial hub opening whereby when the frames are in an assembled relationship, as shown in Fig. 1, a vertical passage 22 is provided thereby which registers with the passage 10 so that the liquid mixture forced into the press may pass freely throughout the entire length of the passage thus formed. The radiating bars 20 provide each frame with a plurality of compartments 23, and radial ports 24 are formed in each of the hubs 19 and connect the passage 22 with each of the compartments 23.

The compartments 23 in a preferred form of the invention are relatively non-communicating and to close the open sides thereof, we provide between each of the spacing frames a composite filtering pad 25. Each of these pads comprises a flat imperforate metallic plate 26 and adjacent to the upper and lower surface of each of which are placed layers of a filtering paper, preferably ordinary blotting paper, which layers of paper are designated by the numeral 27. Between the layers of the paper 27 and the plate 26 are layers of fine wire mesh screen 28, the entire pad assembly being securely united by means of marginal clips 29 and by interfitting hub clips 30, the latter being aligned with the hubs 19 to form the passage 22.

The horizontal upper surface of the base section 1 is also provided with a composite filtering pad composed of a layer of blotting paper 31. Then one of the composite pads 25 is placed on the paper 31 and on the upper surface of this pad there is placed an additional layer of blotting paper as at 32, the lowermost of the spacing frames being then placed on the paper 32. On the upper surface of the lowermost spacing ring, there is placed a layer of blotting paper, then a filtering pad and a second layer of blotting paper, and upon this assembly is placed the next higher spacing frame. This procedure is carried on throughout the length or height of the filtering sections of the press. This operation is continued until a sufficient area has been established in the various compartments 23 to hold a desired amount of a filtering medium. Preferably this filtering medium comprises an acid-activated clay such as fuller's earth containing a small percentage of free $H_2SO_4$. However, in certain treating operations, fuller's earth alone may be used or other infusorial or diatomaceous filtering earths now commonly used in operations of this general character. In the treating of reclaimed crank case oils, we have secured our best results with the use of the acid-activated clay, above specified.

In the operation of the press, the valve 12 in the inlet line is opened, allowing the oil-clay mixture to be pumped into the passages 10 and 22. From the passage 22, the mixture flows by way of the ports 24 into the individual compartments 23, which trap and retain the filtering material above described. As the pressure on the oil rises, the latter passes through the filtering material, the various layers of blotting paper and wire screening and is finally expressed from the outer edges of the pads 25 from which it is discharged and drops into a receiving chamber 34 provided around the marginal edges of the base 1. From this chamber, the clarified or treated oil is drawn off through the outlet 35 to storage as a finished product. In normal operation, uniform pressures exist in each of the compartments 23, however, if for any reason any one or more of the inlet ports 24 leading to said compartments should become stopped or clogged with foreign matter to produce an unbalanced pressure condition, intercommunication between said compartments will be prevented by the inter-position of the flat imperforate metallic plates 26 which strengthen the pads 25 and reenforce the layers of blotting or filtering paper, preventing the rupture or breaking of the latter by virtue of pressure differentials. Thus a stopped or clogged compartment is automatically by-passed without in any way interfering with the sustained efficient operation of the filter as a whole or without requiring manual adjustment and regulation. It is for this reason that we prefer to use a plurality of the compartments 23 in each of the filtering sections, since by this arrangement, the area of inactivity, due to the clogging of the ports 24, is maintained at a minimum. It will be understood that if the filtering paper or equivalent means were to break or rupture, this would permit the filtering clay to pass through the wire screen and into the oil expressed from the filter, thus necessitating an additional filtering operation. The present invention provides simple yet efficient apparatus for overcoming these objections.

The filter comprising the present invention may thus be used advantageously in redistillation processes to restore the original color of lubricating oil by bringing the latter, usually while in a heated state into contact with a suitable filtering clay or medium, and then eliminating the clay or filtering medium by passing the hot oil under pressure through blotting paper, which permits the passage of the oil but effectively retains the filtering clay or medium.

As shown in Fig. 6, a modified form of spacing frame is provided wherein the bars 20' are formed with elongated slots 20a which in this instance provide for oil flow between the various compartments of a spacing ring, so that in the event one or more of the ports 24 should become clogged, sustained oil flow through the press will not be interrupted and furthermore, pressure differentials in different parts of the press will be avoided.

It is obvious that various departures may be made in the form of the filter press herein specifically disclosed without departing from the essential features of the invention, as above pointed out and we therefore reserve the right to employ all such variations or modifications of our invention as may be said to fall within the scope of the following claims.

What is claimed is:

1. In a filter press, a plurality of juxtaposed frame members, each of said members being provided with a plurality of relatively non-communicating compartments adapted to contain a filtering medium, there being individual fluid supply ports leading to each of said compartments from a common source of fluid supply, means for retaining said members in assembled relationship, and filtering pads disposed between said members and separating said compartments.

2. In a filter press, a plurality of separable frames arranged side by side in registering relationship, each of said frames being subdivided into a plurality of compartments adapted to contain a filtering medium, individual inlets leading from a common source of liquid supply into each of said compartments, separable filtering pads interposed between adjoining frames and serving to space said compartments relatively, and clamping means for retaining said frames and pads in assembled relationship.

3. In a filter press, a plurality of separable frames adapted to be disposed in registering relationship, each of said frames being provided with a plurality of compartments for the retention of a filtering medium, means for supplying each of said compartments with a liquid under pressure, filtering pads arranged between said frames by which said compartments are rendered relatively non-communicating, and means for frictionally uniting said frames and pads in assembled relationship.

In testimony whereof we affix our signatures.

FRANCIS E. SYMONS.
FRANK M. COWGILL.